(12) United States Patent
Hasan

(10) Patent No.: US 12,400,253 B1
(45) Date of Patent: Aug. 26, 2025

(54) INTERACTIVE SALES FUNNEL SYSTEM AND METHOD

(71) Applicant: Ricky Hasan, Troy, FL (US)

(72) Inventor: Ricky Hasan, Troy, FL (US)

(*) Notice: Subject to any disclaimer, the term of this patent is extended or adjusted under 35 U.S.C. 154(b) by 430 days.

(21) Appl. No.: 17/826,890

(22) Filed: May 27, 2022

Related U.S. Application Data

(60) Provisional application No. 63/194,945, filed on May 29, 2021.

(51) Int. Cl.
*G06Q 30/00* (2023.01)
*G06Q 30/0601* (2023.01)

(52) U.S. Cl.
CPC ............... *G06Q 30/0625* (2013.01)

(58) Field of Classification Search
CPC ............ G06Q 30/00; G06Q 30/0601; G06Q 30/0625; G06Q 30/0633; G06Q 30/0641
See application file for complete search history.

(56) References Cited

U.S. PATENT DOCUMENTS

| | | | |
|---|---|---|---|
| 6,064,982 A | | 5/2000 | Puri |
| 6,731,788 B1* | | 5/2004 | Agnihotri .............. G11B 27/28 |
| | | | 382/165 |
| 7,546,248 B2 | | 6/2009 | Ellison et al. |
| 8,200,524 B2 | | 6/2012 | Narvaez et al. |
| 8,214,238 B1 | | 7/2012 | Fairfield et al. |
| 8,271,355 B2 | | 9/2012 | Johnson et al. |
| 8,458,053 B1* | | 6/2013 | Buron ................ H04N 21/4316 |
| | | | 705/26.1 |
| 8,660,869 B2 | | 2/2014 | MacIntyre et al. |
| 8,660,912 B1* | | 2/2014 | Dandekar .............. G06Q 30/02 |
| | | | 705/26.1 |
| 8,660,953 B2 | | 2/2014 | Enand et al. |
| 8,977,554 B1* | | 3/2015 | Hertschuh .......... G06Q 30/0623 |
| | | | 704/270 |

(Continued)

OTHER PUBLICATIONS

Ramanujan, Devarajan, William Z. Bernstein, and Karthik Ramani. "Design patterns for visualization-based tools in sustainable product design." International Design Engineering Technical Conferences and Computers and Information in Engineering Conference. vol. 58165. (Year: 2017).*

(Continued)

*Primary Examiner* — Christopher B Seibert
(74) *Attorney, Agent, or Firm* — John Rizvi; John Rizvi, P.A.—The Patent Professor®

(57) ABSTRACT

An interactive sales funnel system and method that provides for delivery, execution, management, and optimization of an interactive sales funnel associated with the offering for sale of a product and/or service to a third party. The interactive sales funnel system employs a graphical interface for display on a display device comprising a product need visualization wheel together with a visual questionnaire that are utilized by a consumer to perform a customized product needs assessment. Based on that customized product needs assessment, the graphical interface is updated to show a visual depiction of a relationship between respective consumer inputs, as a function of specific product need assessment categories, received in relation to each other. The consumer then makes an informed purchasing decision based on the depicted visual relationship.

20 Claims, 9 Drawing Sheets

(56) References Cited

U.S. PATENT DOCUMENTS

| | | | |
|---|---|---|---|
| 9,972,014 B2 | 5/2018 | McCord et al. | |
| 10,068,029 B2 | 9/2018 | Lu et al. | |
| 10,270,912 B2 | 4/2019 | Piaggio et al. | |
| 10,346,621 B2 | 7/2019 | Athuluru Tlrumala et al. | |
| 10,657,549 B2 | 5/2020 | Meyer et al. | |
| 10,664,534 B2 | 5/2020 | Surya et al. | |
| 11,106,751 B1* | 8/2021 | Kadayam | G06F 16/954 |
| 2002/0194055 A1 | 12/2002 | Takakura et al. | |
| 2003/0129574 A1* | 7/2003 | Ferriol | G09B 5/00 434/323 |
| 2003/0167198 A1 | 9/2003 | Northcot et al. | |
| 2004/0115605 A1* | 6/2004 | Cooper | G09B 23/28 600/300 |
| 2005/0108094 A1* | 5/2005 | Hugron | G06Q 30/02 705/14.44 |
| 2007/0050406 A1* | 3/2007 | Byers | G06F 16/48 |
| 2007/0106570 A1* | 5/2007 | Hartman | G06Q 30/0605 705/26.8 |
| 2007/0112647 A1* | 5/2007 | Borders | G06Q 30/016 705/26.81 |
| 2007/0294240 A1* | 12/2007 | Steele | G06F 16/338 707/999.005 |
| 2008/0103876 A1 | 5/2008 | Armstrong et al. | |
| 2008/0103913 A1 | 5/2008 | Leach et al. | |
| 2008/0162684 A1* | 7/2008 | Neyama | H04L 67/02 709/223 |
| 2008/0288889 A1 | 11/2008 | Hunet et al. | |
| 2008/0294996 A1 | 11/2008 | Hunt et al. | |
| 2009/0037291 A1* | 2/2009 | Dawson | G06Q 30/0603 705/27.2 |
| 2009/0077672 A1* | 3/2009 | Gold | G06T 9/001 715/202 |
| 2010/0030578 A1* | 2/2010 | Siddique | G06Q 20/12 705/26.1 |
| 2010/0114654 A1* | 5/2010 | Lukose | G06Q 30/00 705/14.54 |
| 2011/0078036 A1* | 3/2011 | Cummings | G06Q 10/10 705/1.1 |
| 2011/0106581 A1 | 5/2011 | Rohrasser et al. | |
| 2012/0130817 A1 | 5/2012 | Bousaleh et al. | |
| 2012/0136756 A1* | 5/2012 | Jitkoff | G06F 16/9577 715/224 |
| 2012/0197700 A1* | 8/2012 | Kalin | G06Q 30/0633 705/26.8 |
| 2012/0233020 A1* | 9/2012 | Eberstadt | G06Q 30/06 705/26.1 |
| 2013/0013427 A1* | 1/2013 | Gonsalves | G06Q 30/02 705/27.1 |
| 2013/0097018 A1 | 4/2013 | Davidson et al. | |
| 2013/0124259 A1 | 5/2013 | Chourey et al. | |
| 2013/0215116 A1* | 8/2013 | Siddique | G06Q 20/40 705/26.7 |
| 2014/0129393 A1* | 5/2014 | Soon-Shiong | G06F 3/0484 705/27.2 |
| 2014/0136334 A1* | 5/2014 | Lagassey | G06Q 30/0277 705/14.69 |
| 2014/0136990 A1* | 5/2014 | Gonnen | H04L 51/18 715/752 |
| 2014/0237394 A1* | 8/2014 | Park | H04L 51/06 715/758 |
| 2014/0297362 A1* | 10/2014 | Kumar | G06Q 30/0253 705/7.29 |
| 2014/0297537 A1* | 10/2014 | Kassemi | G06Q 30/0279 705/67 |
| 2014/0372953 A1* | 12/2014 | Laurance | G06F 3/04817 715/835 |
| 2015/0052014 A1* | 2/2015 | Mason | G06Q 30/0643 705/26.41 |
| 2015/0052061 A1* | 2/2015 | Anderson | G06Q 20/409 705/44 |
| 2015/0088686 A1* | 3/2015 | Glassberg | G06Q 50/01 705/26.8 |
| 2015/0149168 A1* | 5/2015 | Stent | G10L 15/22 704/235 |
| 2015/0170256 A1* | 6/2015 | Pettyjohn | G06Q 30/0603 705/26.9 |
| 2015/0220984 A1 | 8/2015 | Woodget et al. | |
| 2015/0317698 A1* | 11/2015 | Kalyvas | G06Q 30/0214 705/14.66 |
| 2016/0071134 A1 | 3/2016 | Duncan | |
| 2016/0189073 A1 | 6/2016 | Godewyn et al. | |
| 2016/0364734 A1 | 12/2016 | Glanville | |
| 2016/0371854 A1* | 12/2016 | Gershon | G06Q 30/0643 |
| 2017/0032417 A1* | 2/2017 | Amendjian | G06Q 30/0254 |
| 2017/0193434 A1* | 7/2017 | Shah | G05D 1/0212 |
| 2017/0199648 A1* | 7/2017 | Raffo | G06F 3/04842 |
| 2017/0200289 A1* | 7/2017 | Gershon | G06V 10/751 |
| 2019/0340624 A1 | 11/2019 | Kinkead et al. | |
| 2019/0378200 A1* | 12/2019 | Costello | G06Q 30/0635 |
| 2020/0160938 A1* | 5/2020 | Majumdar | G06F 16/26 |
| 2020/0293568 A1 | 9/2020 | Lu et al. | |
| 2020/0302510 A1* | 9/2020 | Chachek | G06V 20/52 |
| 2022/0351266 A1* | 11/2022 | Ren | G06Q 10/06395 |
| 2022/0357821 A1* | 11/2022 | Roberts | G16H 50/70 |

OTHER PUBLICATIONS

Rosa, Jose Antonio, and Joseph F. Porac. "Categorization bases and their influence on product category knowledge structures." Psychology & Marketing 19.6 (2002): 503-531. (Year: 2002).*

* cited by examiner

INTERACTIVE SALES FUNNEL SYSTEM AND METHOD

CROSS-REFERENCE TO RELATED APPLICATION

This application claims the benefit of U.S. Provisional Application 63/194,945, filed May 29, 2021, which is hereby incorporated by reference herein in its entirety.

FIELD OF THE INVENTION

The present invention relates generally to sales funnel operations, and more particularly, to a system and method that facilitate an interactive sales funnel experience between a consumer and a salesperson that allow the consumer to interactively define and assess their individual needs for a particular product or service.

BACKGROUND OF THE INVENTION

The marketing and selling of products and services is a cornerstone in any thriving economy. The buying and selling of products and services has resulted in a vast array of schemes which are used to vary the price at which such products are sold. The so-called purchase funnel, or purchasing funnel, is a consumer-focused marketing model that illustrates the theoretical customer journey toward the purchase of a good or service. The so-called "AIDA-model" is a model that maps a theoretical customer journey from the moment a brand or product attracted consumer attention to the point of action or purchase. The AIDA acronym stands for Awareness, Interest, Desire, and Action. This staged process is summarized as: (1) awareness—the customer is aware of the existence of a product or service; (2) interest—actively expressing an interest in a product group; (3) desire—aspiring to a particular brand or product, and (4) action—taking the next step towards purchasing the chosen product. The purchase funnel is alternatively referred to as the "customer funnel", "marketing funnel" or the "sales funnel". Some variants of the AIDA-model replace attention with awareness. The common thread among all hierarchical models is that advertising operates as a stimulus and the purchase decision is a response. In other words, the AIDA-model is an applied stimulus-response model.

The basic AIDA-model is one of the longest serving hierarchical models, having been in use for more than a century. Using a hierarchical system, such as AIDA, provides the marketer with a detailed understanding of how target audiences change over time, and provides insights as to which types of advertising messages are likely to be more effective at different junctures. Moving from step to step, the total number of prospects diminishes. This phenomenon is sometimes described as a "purchase funnel". A relatively large number of potential purchasers become aware of a product or brand, then a smaller subset becomes interested, with only a relatively small proportion moving through to the actual purchase. This effect is also known as a "customer funnel", "marketing funnel", or "sales funnel". As consumers move through the hierarchy of effects, they pass through both a cognitive processing stage and an affective processing stage before any action occurs. Thus, the hierarchy of effects models all include cognition-affect-behavior as the core steps in the underlying behavioral sequence. As such, the sales funnel is a step-by-step process that allows a salesperson to bring a potential customer one step closer to a product offer and a buying decision through a series of marketing actions such as automated emails, videos, articles, and landing pages that assist in the selling process. For example, a landing page is a page that should clearly communicate who you are as a company and your unique benefits that can benefit the potential customer and collect information from the potential customer so the salesperson can continue to communicate with them at a later time.

In today's electronic commerce world and with the expansion of the Internet and the increase of access to the Internet and other electronic commerce vehicles, a wide variety of web-based interfaces and systems have been developed focused on commerce. These interfaces and systems often enhance the value and utility provided by an Internet web site or electronic information system or service. The success of an Internet web site, for example, may strongly depend on the quality of the utilities provided by the web site. In addition, the growth in the field of Internet web sites has demanded that competitive companies provide more than a single resource on their web site. For example, customer relationship management (CRM) systems and methods are used by organizations to provide a predictable and organized way for interacting with existing customers and potential customers. CRM typically includes specially trained personnel and special purpose software. It is a combination of policies, processes and strategies implemented by an organization to unify customer interactions and provide a method for tracking customer information. CRM often also includes technology for identifying and attracting new and profitable customers as well as creating better relationships with existing customers. CRM involves many organizational aspects that relate to one another, including front and back-office operations, business relationships and interactions, analysis involving target marketing and marketing strategies, and means for generating metrics for measuring the relative success of various marketing and sales efforts. It is one key component of modern marketing organizations and CRM systems include firmographic data, which includes characteristics of an organization often used for segment market analysis.

Similarly, marketing automation systems and methods are used by organizations to communicate with prospects and customers and automate many marketing communication tasks. Whereas a CRM system is often leveraged as a database for the sales organization, a marketing automation solution is mostly leveraged as a database for the marketing organization. Marketing automation is often leveraged to communicate with customers and prospects via email, track and report on campaign responses, profile the quality and sales-readiness of leads generated by marketing programs, prioritize which leads are passed to members of a sales team, and to automate ongoing communication.

In addition to the individual consumer-seller retail relationship, the business-to-business (B2B) marketing relationship includes individuals and organizations that facilitate the sale of their products and services to other companies or organizations that often resell the products and services or use them to support their own operations. Although the difference between consumer-centric and business-centric marketing may appear obvious, there are many distinguishing features between the two that often result in substantial differences in practice. For example, B2B marketing may often involve shorter and more direct channels of distribution. While consumer marketing often involves large demographic groups targeted through mass media and retailers, in B2B marketing the negotiation process between the seller and buyer may be more direct/personal in nature. B2B marketing and sales is conducted through more direct promotional efforts, trade journals and sales calls. However, many of the principles of consumer marketing also apply to B2B marketing, such as defining target markets and matching product and service strengths to the defined target markets. One common and fundamental principle prevails in both worlds, namely, successful sales in high volumes and profitability. The ultimate goal of any of the above sales and/or marketing techniques is to make high volume sales, with the least amount of wasted effort and at the largest profit.

While the sales and marketing schemes described above have various advantages and disadvantages in different situations, a commonality among all of the buying schemes is that each buyer is not given the opportunity to choose amongst different buying criteria, which could be more important to the buyer than the price of the goods and/or services. Furthermore, each seller is not given a chance to offer their goods and/or services based on different selling criteria. In many instances sellers may not even be aware of what buyers consider important buying criteria. Additionally, sellers are sometimes not aware of what other selling criteria that other sellers might offer buyers. As such, a great deal of effort goes into analyzing marketing data and optimizing the sales and marketing processes and product sales funnel.

Accordingly, there is need for a technique that improves sales funnel efficiency and the acceleration of conversions through the sales funnel to facilitate a positive real-time purchasing decision.

SUMMARY OF THE INVENTION

The present invention is directed to an interactive sales funnel system and method that provides for delivery, execution, management, and optimization of an interactive sales funnel associated with the offering for sale of a product and/or service to a third party. The interactive sales funnel system employs a graphical interface for display on a display device comprising a product need visualization wheel together with a visual questionnaire that are utilized by a consumer to perform a customized product needs assessment. Based on that customized product needs assessment, the graphical interface is updated to show a visual depiction of a relationship between respective consumer inputs, as a function of specific product need assessment categories, received in relation to each other. The consumer then makes an informed purchasing decision based on at least the depicted visual relationship.

In a first implementation of the invention, an interactive sales funnel system is provided comprising a display device, a processor; a memory storing instructions that when executed cause the processor to perform operations comprising: (i) generating, by the processor, a graphical interface for display on the display device, the graphical interface comprising a product need visualization wheel together with a visual questionnaire, the product need visualization wheel comprising a form of a circular wheel with a center point, a circumference and a plurality of spokes, each spoke configured between the center point and a particular one point along the circumference of the wheel in a symmetric configuration thereabout, the visual questionnaire comprising a plurality of individual product need assessment categories specific to a product offered for sale to a consumer in accordance with criteria associated with a sales funnel, each individual product need assessment category of the plurality of product need assessment categories having a corresponding graduated consumer assessment scale associated therewith, the graduated consumer assessment scale comprising a plurality of metrics for establishing the consumer's need for the product offered for sale, each particular one spoke of the plurality of spokes corresponding with a particular one individual product need assessment category of the plurality of product need assessment categories, and the product need visualization wheel showing, along a respective one spoke of the plurality of spokes, a respective one graduated consumer assessment scale associated with each individual product need assessment category of the plurality of individual product need assessment categories; (ii) displaying, on the display device, the graphical interface generated; (iii) receiving, from the consumer, a plurality of inputs as a function of the plurality of individual product need assessment categories displayed by the graphical interface and the corresponding graduated consumer assessment scale associated therewith, each input of the plurality of inputs received being specific to a respective one individual product need assessment category of the plurality of individual product need assessment categories and comprising at least a selection of a respective one metric of the plurality of metrics from the graduated consumer assessment scale; (iv) updating, by the processor, the graphical interface displayed as function of the plurality of inputs received such that the graphical interface updated shows a respective one graduated consumer assessment scale associated with each individual category of a plurality of individual categories together with each input of the plurality of inputs received and the respective one metric of the plurality of metrics from the graduated consumer assessment scale selected, and generating, as part of the graphical interface updated, a visual depiction of a relationship between each respective one input received in relation to each other; (v) displaying the graphical interface updated; and (vi) receiving, from the consumer a selection, as a function of the graphical interface updated and the visual depiction of the relationship between each respective one input received in relation to each other, for the product offered for sale.

In a second aspect, a method is provided for managing an interactive sales funnel comprising operations of: (i) generating, by the processor, a graphical interface for display on the display device, the graphical interface comprising a product need visualization wheel together with a visual questionnaire, the product need visualization wheel comprising a form of a circular wheel with a center point, a circumference and a plurality of spokes, each spoke configured between the center point and a particular one point along the circumference of the wheel in a symmetric configuration thereabout, the visual questionnaire comprising a plurality of individual product need assessment categories specific to a product offered for sale to a consumer in accordance with criteria associated with a sales funnel, each individual product need assessment category of the plurality of product need assessment categories having a corresponding graduated consumer assessment scale associated therewith, the graduated consumer assessment scale comprising a plurality of metrics for establishing the consumer's need for the product offered for sale, each particular one spoke of the plurality of spokes corresponding with a particular one individual product need assessment category of the plurality of product need assessment categories, and the product need visualization wheel showing, along a respective one spoke of the plurality of spokes, a respective one graduated consumer assessment scale associated with each individual product need assessment category of the plurality of individual product need assessment categories; (ii) displaying, on the display device, the graphical interface generated; (iii)

receiving, from the consumer, a plurality of inputs as a function of the plurality of individual product need assessment categories displayed by the graphical interface and the corresponding graduated consumer assessment scale associated therewith, each input of the plurality of inputs received being specific to a respective one individual product need assessment category of the plurality of individual product need assessment categories and comprising at least a selection of a respective one metric of the plurality of metrics from the graduated consumer assessment scale; (iv) updating, by the processor, the graphical interface displayed as function of the plurality of inputs received such that the graphical interface updated shows a respective one graduated consumer assessment scale associated with each individual category of a plurality of individual categories together with each input of the plurality of inputs received and the respective one metric of the plurality of metrics from the graduated consumer assessment scale selected, and generating, as part of the graphical interface updated, a visual depiction of a relationship between each respective one input received in relation to each other; (v) displaying the graphical interface updated; and (vi) receiving, from the consumer a selection, as a function of the graphical interface updated and the visual depiction of the relationship between each respective one input received in relation to each other, for the product offered for sale.

In a third aspect, an interactive sales funnel system application (alternatively referred to herein as an "app") for executing, on a user device or other hardware, is provided comprising operations of: (i) generating, by the processor, a graphical interface for display on the display device, the graphical interface comprising a product need visualization wheel together with a visual questionnaire, the product need visualization wheel comprising a form of a circular wheel with a center point, a circumference and a plurality of spokes, each spoke configured between the center point and a particular one point along the circumference of the wheel in a symmetric configuration thereabout, the visual questionnaire comprising a plurality of individual product need assessment categories specific to a product offered for sale to a consumer in accordance with criteria associated with a sales funnel, each individual product need assessment category of the plurality of product need assessment categories having a corresponding graduated consumer assessment scale associated therewith, the graduated consumer assessment scale comprising a plurality of metrics for establishing the consumer's need for the product offered for sale, each particular one spoke of the plurality of spokes corresponding with a particular one individual product need assessment category of the plurality of product need assessment categories, and the product need visualization wheel showing, along a respective one spoke of the plurality of spokes, a respective one graduated consumer assessment scale associated with each individual product need assessment category of the plurality of individual product need assessment categories; (ii) displaying, on the display device, the graphical interface generated; (iii) receiving, from the consumer, a plurality of inputs as a function of the plurality of individual product need assessment categories displayed by the graphical interface and the corresponding graduated consumer assessment scale associated therewith, each input of the plurality of inputs received being specific to a respective one individual product need assessment category of the plurality of individual product need assessment categories and comprising at least a selection of a respective one metric of the plurality of metrics from the graduated consumer assessment scale; (iv) updating, by the processor, the graphical interface displayed as function of the plurality of inputs received such that the graphical interface updated shows a respective one graduated consumer assessment scale associated with each individual category of a plurality of individual categories together with each input of the plurality of inputs received and the respective one metric of the plurality of metrics from the graduated consumer assessment scale selected, and generating, as part of the graphical interface updated, a visual depiction of a relationship between each respective one input received in relation to each other; (v) displaying the graphical interface updated; and (vi) receiving, from the consumer a selection, as a function of the graphical interface updated and the visual depiction of the relationship between each respective one input received in relation to each other, for the product offered for sale.

In a fourth aspect, the interactive sale funnel app may be a mobile application executing on a mobile device and wherein the mobile device may be a smartphone, laptop computer, tablet and/or wearable device.

In a fifth aspect, the product offered for sale is related to toll management, and the plurality of individual product need assessment categories include violations, stress level, consolidation, need to manage, number of transponders, discounts, managing system, and time allocated.

In a sixth aspect, a uniformity of the visual depiction of the relationship between each respective one input received in relation to each other is used to determine a consumer's product needs.

In a seventh aspect, the graduated consumer assessment scale is a numerical scale.

In another aspect, the numerical scale comprises a range from 1 to 10, wherein an assessment of "1" represents a worst or lowest rating possible rating and an assessment of "10" represents a best or highest rating possible.

In another aspect, the greater the uniformity of the visual depiction generated of the relationship between each respective one input received in relation to each other represents a lesser need for the product offered for sale by the consumer.

In another aspect, the lesser the uniformity of the visual depiction generated of the relationship between each respective one input received in relation to each other represents a greater need for the product offered for sale by the consumer.

In another aspect, if the visual depiction generated of the relationship between each respective one input received in relation to each other in any one visual depiction is that of a circle, then the relationship between the plurality of metrics, as depicted by the visual depiction generated, is indicative of a lesser need for the product offered for sale by the consumer.

In another aspect, the product need visualization wheel and the visual questionnaire are fully customizable.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

Figure 1:
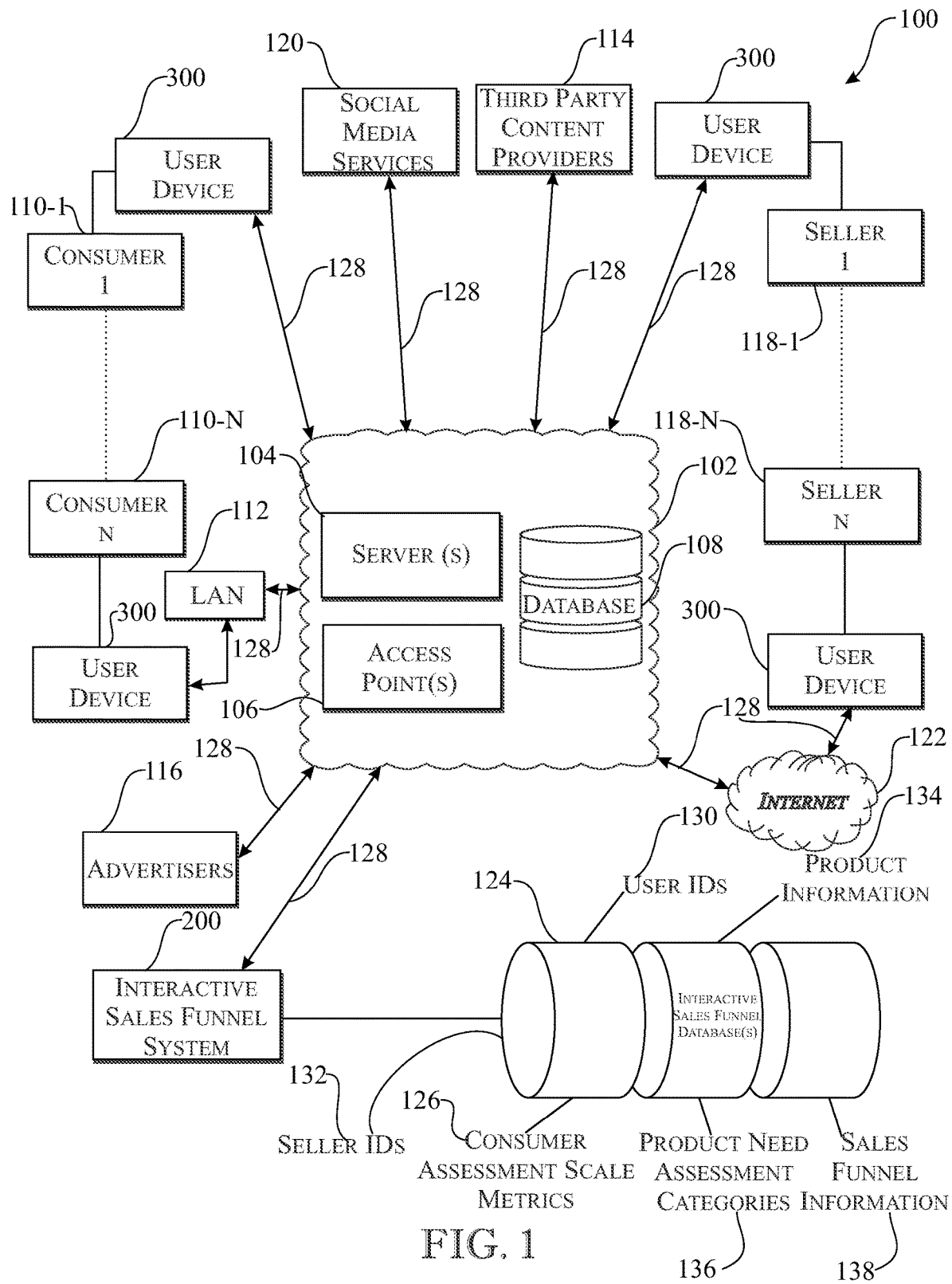
FIG. 1 presents a high-level block diagram of a cloud network service architecture for providing an interactive sales funnel system in accordance with an embodiment.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in the figures herein. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward an interactive sales funnel system and method that provides for delivery, execution, management, and optimization of an interactive sales funnel associated with the offering for sale of a product and/or service to a third party (e.g., individual consumer or B2B purchaser). Importantly, the interactive sale funnel system of the disclosed embodiments provides an advantageous improvement of at least one practical application, i.e., the product sales application, in that the individual consumer will play a direct and interactive role in the engagement with the salesperson. In accordance with the disclosed embodiments, that practical sales application provides for an interactive engagement, by and through a specifically configured application executing on a hardware system, with the individual consumer that allows the consumer to play an important role in the overall sales process and coming to their own realization of whether they need a particular product or not based on a customized needs assessment. In this way, the customer is actively engaged and formulates their own product need assessment, for example, through the AIA-model steps of (1) awareness—the customer is aware of the existence of a product or service; (2) interest—actively expressing an interest in a product group; (3) desire—aspiring to a particular brand or product; and (4) action—taking the next step towards purchasing the chosen product. This interactive engagement, in accordance with the disclosed embodiments, is facilitated by a customized visualization tool and graphical interface, as further detailed herein below. The interactive sales funnel system employs the graphical interface for display on a display device comprising a product need visualization wheel together with a visual questionnaire that are utilized by a consumer to perform a customized product needs assessment. Based on that customized product needs assessment, the graphical interface is updated to show a visual depiction of a relationship between respective consumer inputs, as a function of specific product need assessment categories, received in relation to each other. The consumer then makes an informed purchasing decision based on at least the depicted visual relationship.

FIG. 1 presents a high-level block diagram of a cloud network service architecture 100 for delivering, executing, managing, and optimizing an interactive sales funnel associated with the offering for sale of a product and/or service to a third party (e.g., individual consumer or B2B purchaser) in accordance with an embodiment. For clarity and the avoidance of doubt, it will be understood that the use of the term "consumer" herein means any type of consumer including, but not limited, an individual consumer and B2B purchaser. Similarly, the use of the term "product" herein shall mean both a product and/or service that is offered for sale to a consumer. As shown for instance in FIG. 1, the cloud network service architecture 100 includes a cloud 102 comprising at least server(s) 104, access point(s) 106 and database(s) 108. As will be detailed herein below, the cloud 102 facilitates the delivery of the interactive sales funnel using interactive sales funnel system 200 to a plurality of consumers (e.g., the plurality consumers comprised by consumer 1 110-1 through consumer N 110-N) and a plurality of sellers (e.g., seller 1 118-1 through seller N 118-N), whereby the individual consumers will play an important role in the overall sales process and coming their own realization of whether they need a particular product or not based on a customized needs assessment made through their use a customized visualization tool and graphical interface as provided in accordance with the principles of the disclosed embodiments. In an embodiment, the customized visualization tool and graphical interface, and associated operations, offered by and through the cloud network service architecture 100 will be facilitated by an interactive sales funnel app (see, FIG. 4), as will be detailed herein below, executing on a user device 300 (see, FIG. 3). The user device 300 provides consumers (e.g., consumer 1 110-1 through consumer N 110-N) with real-time access to sales funnel services for the purchasing of products in accordance with the disclosed embodiments herein.

As noted above, the cloud 102 comprises at least server(s) 104, the access point(s) 106 and the database(s) 108. Cloud, cloud service, cloud server and cloud database are broad terms and are to be given their ordinary and customary meaning to one of ordinary skill in the art and includes, without limitation, any database, data repository or storage media which store content typically associated with and managed by users, product sales and marketing services, product sales funnel providers, third party content providers, social media services, to name just a few. A cloud service may include one or more cloud servers and cloud databases that provides for the remote storage of content as hosted by a third-party service provider or operator. A cloud server may include an HTTP/HTTPS server sending and receiving messages in order to provide web-browsing interfaces to client web browsers as well as web services to send data to integrate with other interfaces (e.g., as executed on the user device 300). The cloud server may be implemented in one or more servers and may send and receive content in a various forms and formats, user supplied and/or created information/content and profile/configuration data that may be transferred to, read from or stored in a cloud database (e.g., the databases 108). The cloud 102 may also facilitate the use by one or more seller of the plurality of sellers, advertisers 142, social media services 120 and/or third-party content providers 114 in the course of the product offerings and the use of the interactive sales funnel system 200.

A cloud database may include one or more physical servers, databases or storage devices as dictated by the cloud service's storage requirements. The cloud database may further include one or more well-known databases (e.g., an SQL database) or a fixed content storage system to store content, profile information, configuration information or administration information as necessary to execute the cloud service. In various embodiments, one or more networks providing computing infrastructure on behalf of one or more users may be referred to as a cloud, and resources may include, without limitation, data center resources, applications (e.g., software-as-a-service or platform-as-a-service) and management tools. In this way, in accordance with various embodiments, the users may control, initiate, and engage in the interactive sales funnel services herein in a fully transparent fashion without any required understanding of the underlying hardware and software necessary to interface, communicate, manipulate, and exchange information and/or data necessary to deliver such services.

Figure 2:
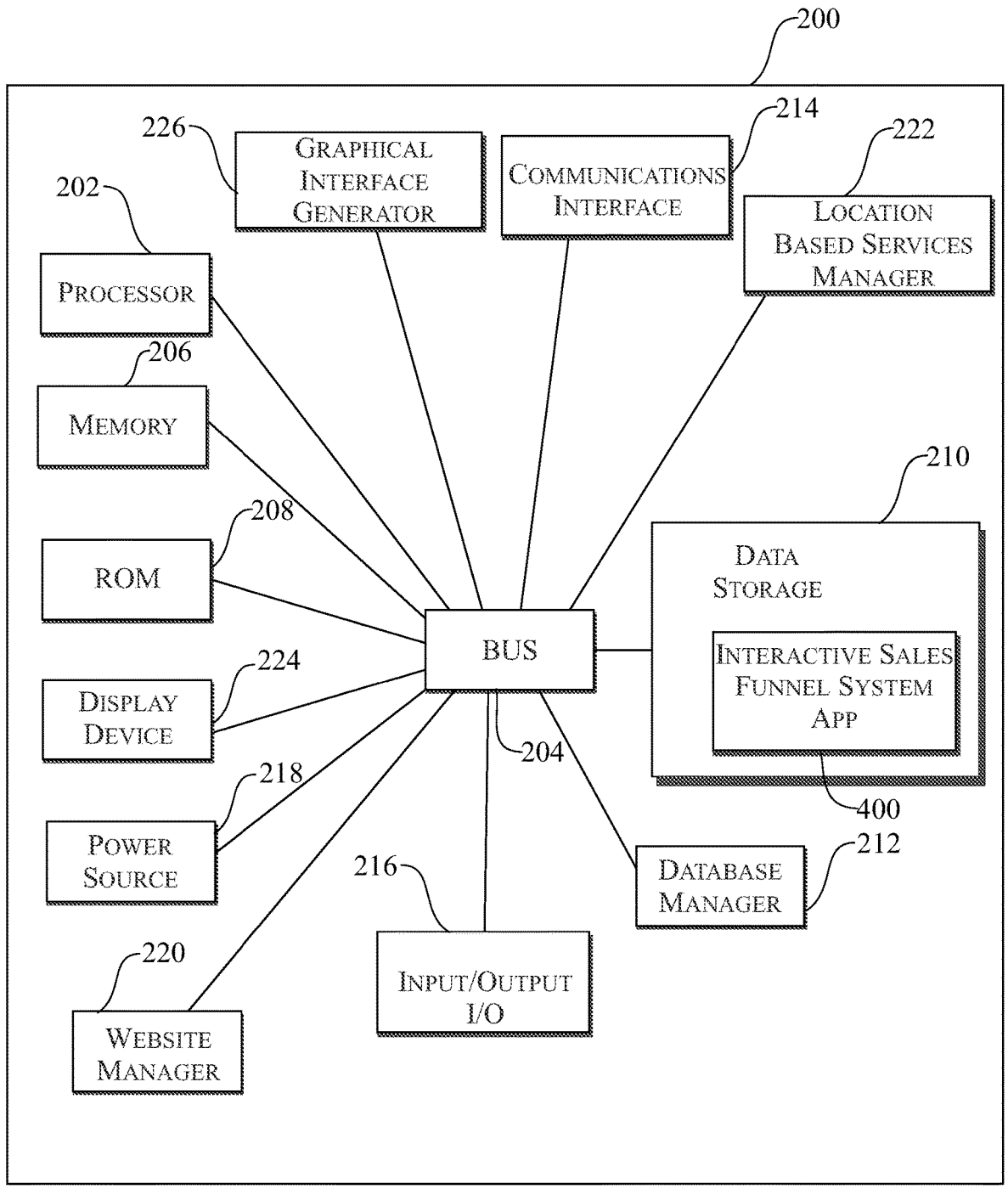
FIG. 2 presents an illustrative interactive sales funnel system in accordance with an embodiment.

Turning our attention to FIG. 2, an illustrative configuration for the interactive sales funnel system 200 is shown for deployment in the cloud network service architecture 100 in accordance with an embodiment. As shown, the interactive sale funnel system 200 comprises processor 202 for executing program code (e.g., interactive sales funnel system app 400) and communications interface 214 for managing communications to and from the interactive sales funnel system 200, memory 206 and/or ROM 208 for storing program code and data, and power source 218 for powering the interactive sale funnel system 200. The memory 206 is coupled to the bus 204 for storing computer-readable instructions to be executed by the processor 200 (e.g., execution of the interactive sales funnel system app 400). Database manager 212 is used to manage the delivery and storage of content, data, and other information in the interactive sales funnel database(s) 124 and across third party content providers, for example. The interactive sales funnel database(s) 124 may store and provide information including, but not limited to, consumer IDs 130, Seller IDs 132, product information 134, product need assessment categories 136, sales funnel information 138, and consumer assessment scale metrics 140. Similarly, website manager 220 is used to deliver and manage content, data, and other information across one or more websites that may be utilized to access and use the interactive sales funnel system 200, for example. As will be discussed in greater detail herein below, the interactive sales funnel system app 400, as stored in data storage 210, when executed by the processor 202 will enable access by the consumer (e.g., consumer 1 110-1) to the interactive sales funnel system 200 for delivery, execution, management, and optimization of an interactive sales funnel associated with the offering for sale of a product and/or service to a third-party (e.g., individual consumer or B2B purchaser). Location-based service manager 222 facilitates the delivery of location-based services (e.g., GPS tracking) either independently or on user device 300 thereby allowing the interactive sales funnel system 200 to register the exact location of the user of the user device 300, for example, as the user roams from one location to another location such that the products offered via the interactive sales funnel may be tailored to a current location and/or the product needs of the user/consumer may change based on their current location. Importantly, the interactive sale funnel system 200 provides an advantageous improvement of at least one practical application, i.e., the product sales application, in that the individual consumer will play a direct and interactive role in the engagement with the salesperson. In accordance with the disclosed embodiments, that practical sales application provides for an interactive engagement, by and through a specifically configured application executing on a hardware system, with the individual consumer will allow the consumer to play an important role in the overall sales process and coming to their own realization of whether they need a particular product or not based on a customized needs assessment. This interactive engagement with the consumer, in accordance with the disclosed embodiments, is facilitated by a customized visualization tool and graphical interface, as further detailed herein below, that is displayed by and through display device 224, for example, using graphical interface generator 226. It will be understood that while the instant embodiment shows the display device 224 integrated within the interactive sales funnel system 200 this is not limiting in nature and the display device 224 may be independent of and external to the interactive sales funnel system 200 in accordance with principles of the disclosed embodiments herein.

In a further embodiment, the interactive sales funnel services provided through the execution of the interactive sales funnel system app 400 may also include accessing and interfacing any number of web pages (e.g., as constructed and hosted by the third-party content providers 114) with a variety of third-party websites using website manager 220 for procuring information and data that can be used in the interactive sales funnel system. The term "website" in the context herein is used in a conventional and broadest sense and is located on at least one server containing web pages stored thereon and is operational in a 24-hour/7-day typical fashion. As shown in the interactive sales funnel system 200, the plurality of consumers (i.e., consumer 1 110-1 through consumer N 110-N) and/or the plurality of sellers (i.e., seller 1 118-1 through seller N 118-N) may alternatively utilize well-known Internet 122 for access to interactive sales funnel system 200 by and through the user device 300.

The communications interface 214 is used to facilitate communications across the communications links 128 (see, FIG. 1) within the cloud 102 in a well understand fashion. This may take the form, for example, of a wide area network connection that communicatively couples the interactive sales funnel system 200 with the access points 106 (see, FIG. 1) which may be a cellular communications service. Similarly, communications managed by the communications interface 214 may take the form, for example, of a local Wi-Fi network interface or Ethernet interface the communicatively couples the interactive sale funnel system 200 with the Internet 122, LAN 112 and ultimately the user device 300. In the instant embodiment, the interactive sales funnel system app 400 and/or the communications interface 214 may include a communications stack for facilitating communications over the respective communications link 128. Electronic communications by and through interactive sales funnel system 200 between the various systems, networks, devices, users, entities, and/or individuals are facilitated by the communications links 128 in accordance with any number of well-known communications protocols and methods (e.g., wireless communications).

Figure 3:
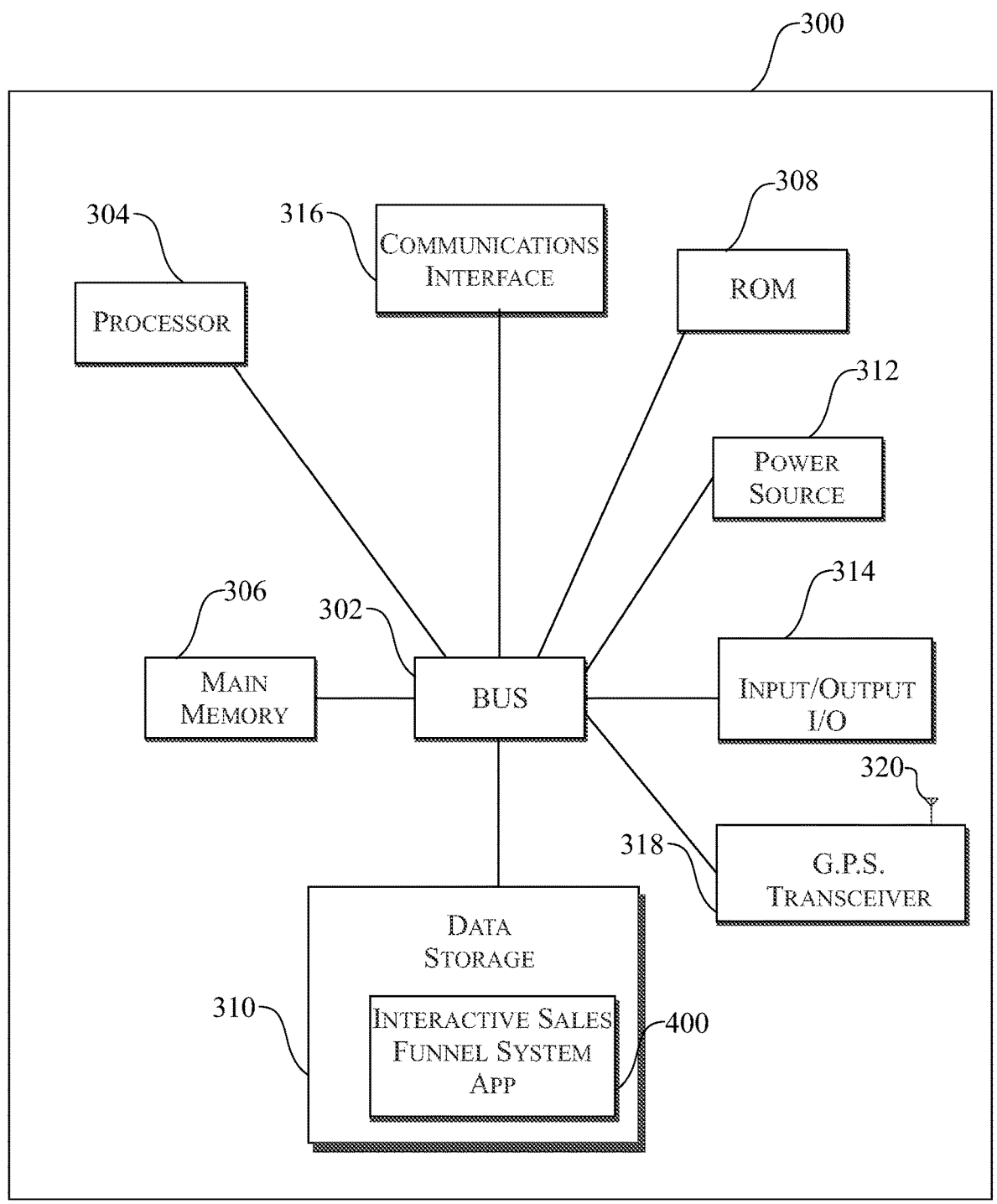
FIG. 3 presents an illustrative user device configured for use with the interactive sales funnel system of FIG. 2 in accordance with an embodiment.

Turning our attention briefly to FIG. 3, an illustrative user device 300 is shown for deployment with the cloud network service architecture 100 of FIG. 1 in accordance with an embodiment. The user device 300 includes bus 302 and processor 304 coupled to the bus 302 for executing operations and processing information. As will be appreciated, a "user device" in the context herein may comprise a wide variety of devices such as any type of mobile device, smartphones, laptop computers, tablets, and wearable device, to name just a few, that execute applications (e.g., a mobile application) in accordance with the principles of the disclosed embodiments herein. For example, the execution of the operations of interactive sales funnel system app 400 as will be discussed in much greater detail herein below. The processor 304, as powered by power source 312, may include both general and special purpose microprocessors, and may be the sole processor or one of multiple processors of the device. This holds true also for the processor 202 of FIG. 2. Further, the processor 304 (or the processor 202) may comprise one or more central processing units (CPUs) and may include, be supplemented by, or incorporated in, one or more application-specific integrated circuits (ASICs) and/or one or more field programmable gate arrays (FPGAs).

The user device 300 may also include main memory 306 coupled to the bus 302 for storing computer-readable instructions to be executed by the processor 304 in a well-known manner. The memory 306 may also be utilized for storing temporary variables or other intermediate information during the execution of the instructions by the processor 304. The user device 300 may also include read-only memory (ROM) 308 or other static storage device coupled to the bus 302. Further, data storage device 310, such as a magnetic, optical, or solid-state device may be coupled to the bus 302 for storing information and instructions for the processor 304 including, but not limited to, the interactive sales funnel system app 400. Data storage device 310 (or the data storage device 210) and the memory 306 (or the memory 206) may each comprise a tangible non-transitory computer readable storage medium and may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

The user device 300 may also include one or more communications interface 316 for communicating with other devices via a network (e.g., a wireless communications network) or communications protocol (e.g., Bluetooth®). For example, such communication interfaces may be a receiver, transceiver, or modem for exchanging wired or wireless communications in any number of well-known fashions. For example, the communications interface 316 (or the communications interface 214) may be an integrated services digital network (ISDN) card or modem/router used to facilitate data communications of various well-known types and formats. Further, illustratively, the communications interface 316 (or the communications interface 214) may be a local area network (LAN) card used to provide data communication connectivity to a comparable LAN. Wireless communication links may also be implemented. The Global Positioning System (GPS) transceiver 318 and antenna 320 facilitate delivery of location-based services in a well-known manner to register the exact location of the user of the user device 300, for example, as the user roams from one location to another location the products offered via the interactive sales funnel may be tailored to a current location and/or the product needs of the user/consumer may change based on their current location.

As will be appreciated, the functionality of the communication interface 316 (or the communications interface 214) is to send and receive a variety of signals (e.g., electrical, optical, or other signals) that transmit data streams representing various data types. The user device 300 may also include one or more input/output devices 314 that enable user interaction with the user device 300 (e.g., camera, display, keyboard, mouse, speakers, microphone, buttons, etc.). The input/output devices 314 (or the I/O devices 216) may include peripherals, such as a camera, printer, scanner, display screen, etc. For example, the input/output devices 314 (or I/O devices 214) may include a display device such as a cathode ray tube (CRT), plasma monitor, liquid crystal display (LCD) monitor or organic light-emitting diode (OLED) monitor for displaying information to the user, a keyboard, and a pointing device such as a mouse or a trackball by which the user can provide input to the user device 300 or an associated display device, for example. As detailed herein, while FIG. 3 describes an embodiment of the interactive sales funnel system app 400 for execution, illustratively, on the user device 300 it will also be understood that other hardware devices may be used to execute and operate the interactive sales funnel system app 400 in any real-time setting including but not limited to the interactive sales funnel system 200. For example, a network-enabled portable tablet computer and/or dedicated portable hardware device may be employed equally in the context of the disclosed embodiments.

Figure 4:
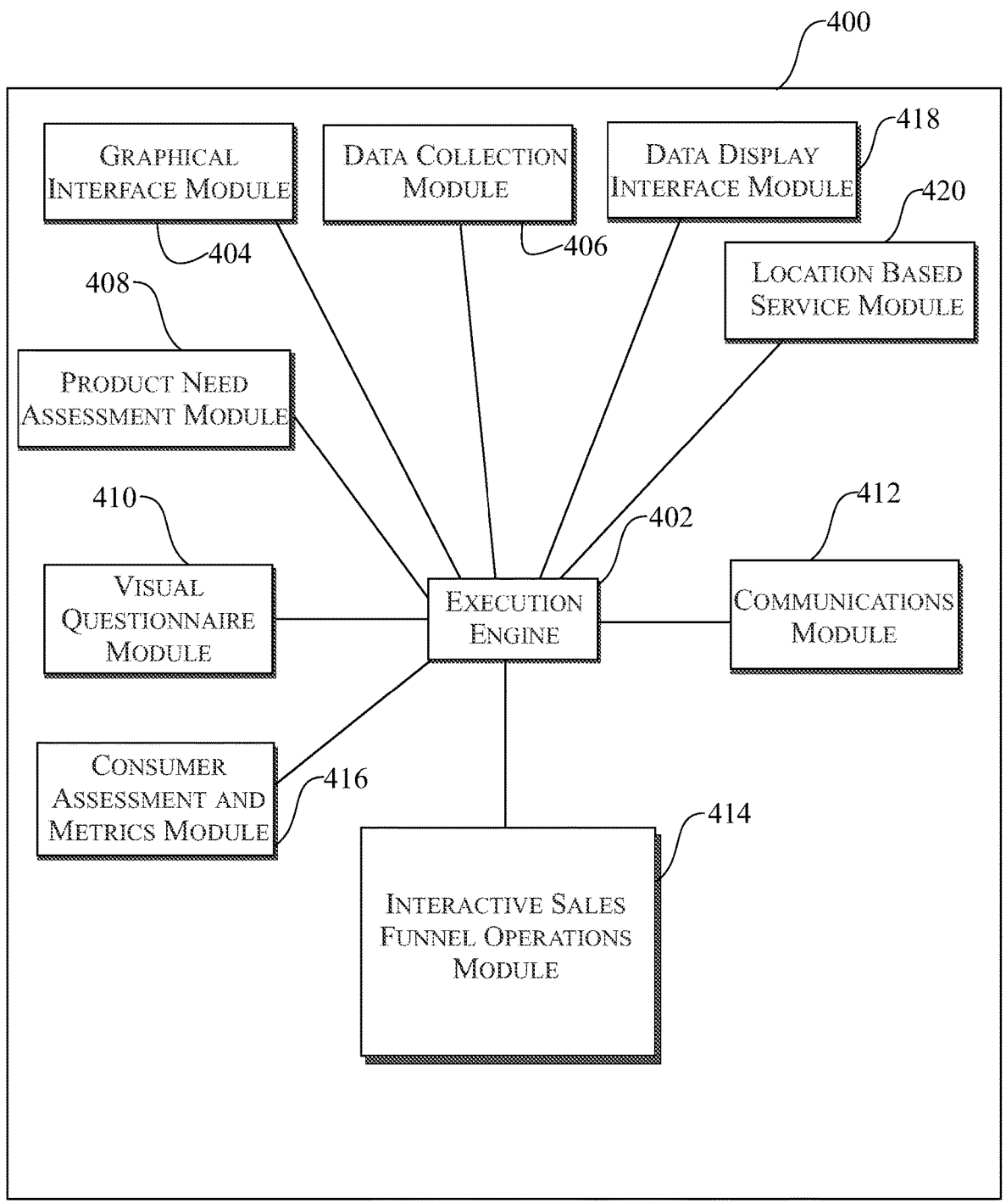
FIG. 4 presents an illustrative architecture for an interactive sales funnel system app in accordance with an embodiment.

Turning our attention to FIG. 4, an illustrative architecture for the operation of the interactive sales funnel system app 400 is presented in accordance with an embodiment. As will be appreciated, the architecture may be used in conjunction with the interactive sales funnel system 200 and/or the user device 300 for launching and executing the interactive sales funnel system app 400 and its associated operations. As shown, the architecture for the operation of the interactive sales funnel system app 400 provides several interfaces and engines used to perform a variety of functions such as the collection, aggregation, manipulation, processing, analyzing and display of applicable real-time information and data that are useful to achieve the interactive sales funnel services of the disclosed embodiments. More particularly, data display interface module 418 and communications module 412 are used to facilitate the input/output and display of electronic data and other information (e.g., a graphical user interface) to, illustratively, the users (e.g., consumer 1 110-1 through consumer N 110-N) employing the user device 300 (e.g., a touch screen of the user device 300) and executing the interactive sales funnel system app 400. The data collection interface module 406 facilitates the collection of sales funnel information from the plurality of consumers (i.e., consumer 1 110-1 through consumer N 110-N), the plurality of sellers (i.e., seller 1 118-1 through seller N 118-N) and/or other third parties. The data display interface module 418 facilitates the delivery of the graphical interface that enables the interactive sales funnel services, as will be further detailed herein below. The location-based services module 420 provides for the delivery of location-based services in order for the geographic locations of the consumers to be identified and displayed (e.g., GPS locations). The communications module 412 will facilitate communications by and through the interactive sales funnel system 200, for example.

Execution engine 402 may be employed to deliver the interactive sales funnel services herein through the execution of the interactive sales funnel system app 400. In such delivery, the execution engine 402 will operate and execute, as further detailed herein below, with at least the following program modules: graphical interface module 404, data collection module 406, data display interface module 418, location-based services module 420, product need assessment module 408, visual questionnaire module 410, communications module 412, interactive sales funnel operations module 414, and consumer assessment and metrics module 416. More particularly, the graphical interface module 404, the data collection module 406, the data display interface module 418, the product need assessment module 408, the visual questionnaire module 410, the communications module 412, the interactive sales funnel operations module 414, and the consumer assessment and metrics module 416 will provide for operations that when executed will deliver features of generating a unique graphical interface for display on a display device. As will be detailed further herein below, the interactive sales funnel services delivered herein, as managed by the interactive sales funnel operations module 414, utilize a graphical interface comprising a product need visualization wheel together with a visual questionnaire, the product need visualization wheel comprising a form of a circular wheel with a center point, a circumference and a plurality of spokes, each spoke configured between the center point and a particular one point along the circumference of the wheel in a symmetric configuration thereabout. The visual questionnaire, delivered and managed by the visual questionnaire module 410, comprising a plurality of individual product need assessment categories specific to a product offered for sale to a consumer in accordance with criteria associated with a sales funnel, each individual product need assessment category of the plurality of product need assessment categories having a corresponding graduated consumer assessment scale associated therewith, and the graduated consumer assessment scale comprising a plurality of metrics for establishing the consumer's need for the product offered for sale.

In an embodiment, the sales funnel managed by the interactive sales funnel system 200, for example, is directed to a toll management product that may be used by transportation professionals to manage infrastructure tolls (e.g., highways, tunnels, bridges, and the like) collected by tolling authorities. As such, the plurality of product need assessment categories, as delivered and managed by the product need assessment module 408, that will be employed in the visual questionnaire include product need assessment categories such as: number of transponders, discounts, violations, consolidation, stress level, need to manage, managing system and time allocated, as will be further discussed herein below. In turn, each of these product need assessment categories will have a graduated consumer assessment, as delivered and managed by the consumer assessment and metrics module 416, ranging from 1 to 10 that a consumer using the interactive sales funnel system 200 will be presented with for their customized assessment ratings. Illustratively, an assessment of "1" represents the worst or lowest rating possible and an assessment of "10" represents the best or highest rating possible. It will be noted that while the illustrative embodiments herein utilize a numerical scale of 1 to 10 this is only one of a plethora of graduated scales that may be used to form the graduated consumer assessment as used herein. Similarly, while the illustrative embodiments herein utilize a toll management product and associated sales funnel factors this is only one of a plethora of products for which the principles of the embodiments herein apply and the number or type of products can be of any nature depending upon only desires of the sellers and/or the relevant market. That is, the product need visualization wheel and/or the visual questionnaire herein are fully customizable to meet the needs of any particular product and/or any particular market. With respect to the product need visualization wheel, each particular one spoke of the plurality of spokes corresponds with a particular one individual product need assessment category of the plurality of product need assessment categories, and the product need visualization wheel will show, along a respective one spoke of the plurality of spokes, a respective one graduated consumer assessment scale associated with each individual product need assessment category of the plurality of individual product need assessment categories. The fundamentals of such product need visualization wheel and its associated utility will now be discussed.

Figure 6:
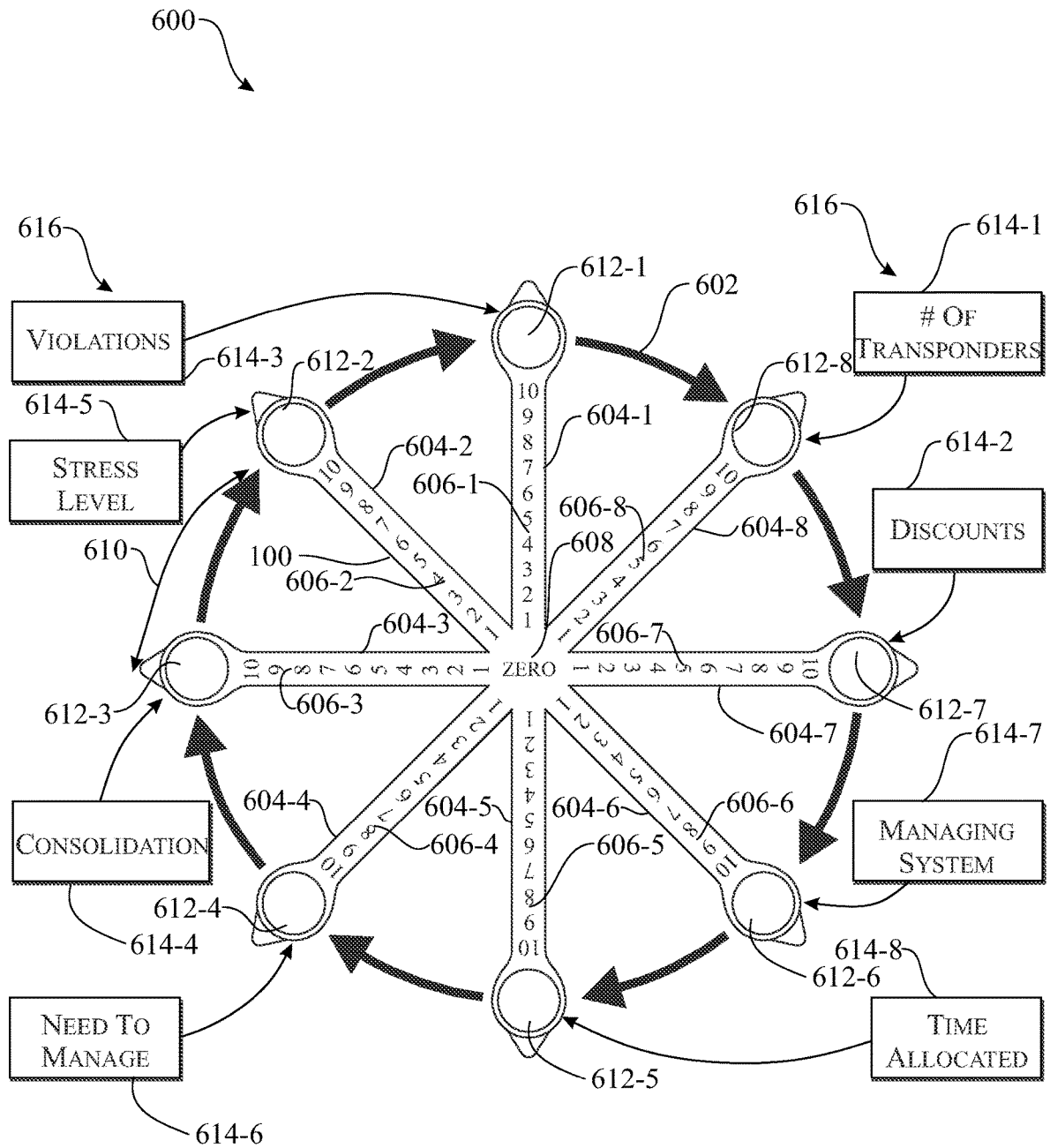
FIGS. 6, 7, 8 and 9 present a series of illustrative graphical interfaces generated by the interactive sales funnel system of FIG. 2 in accordance with an embodiment.

Turning our attention to FIG. 6, one of a series of illustrative graphical interfaces generated by the interactive sales funnel system 200 is shown. As shown, graphical interface 600 comprises product need visualization wheel 602 having a plurality of spokes (i.e., spoke 604-1, spoke 604-2, spoke 604-3, spoke 604-4, spoke 604-5, spoke 604-6, spoke 604-7, and spoke 604-8). In turn, each of the spokes has a graduated consumer assessment scale (i.e., graduated consumer assessment scale 606-1, graduated consumer assessment scale 606-2, graduated consumer assessment scale 606-3, graduated consumer assessment scale 606-4, graduated consumer assessment scale 606-5, graduated consumer assessment scale 606-6, graduated consumer assessment scale 606-7, and graduated consumer assessment scale 606-8). It will be noted that while the illustrative embodiments herein utilize a product need visualization wheel having an eight-spoked wheel configuration this is only one of a plethora of configurations that may be used to form the product need visualization wheel as used herein.

In accordance with the embodiment, the product need visualization wheel 602 is in the form of a circular wheel with a center point 608 and a circumference 610 such that the plurality of spokes is rendered with each spoke configured between the center point 608 and a particular one point along the circumference 610 (i.e., point 612-1, point 612-2, point 612-3, point 612-4, point 612-5, point 612-6, point 612-7, and point 612-8) in a symmetric configuration thereabout. In this way, the product need visualization wheel 602 and its constituent components will be rendered on a display device (e.g., the display device 224). Also, each product need assessment category has its own "radius" or "arm" that extends between the center of the wheel and a corresponding equidistant point along the circumference of the wheel. For example, the radius between the center 608 and the point 612-1 that encompasses spoke 604-1 and the graduated consumer assessment scale 606-1. In accordance with the embodiment, a plurality of inputs is received for a consumer having been presented with the product need visualization wheel 602 together with visual questionnaire 616. Such inputs rendered by, and received from, the consumer as a function of the plurality of individual product need assessment categories displayed by the graphical interface using the visual questionnaire 616 and the corresponding graduated consumer assessment scale associated therewith. As shown, the plurality of product need assessment categories associated with the visual questionnaire 616 as displayed are number of transponders 614-1, discounts 614-2, violations 614-3, consolidation 614-4, stress level 614-5, need to manage 614-6, managing system 614-7 and time allocated 614-8.

Figure 7:
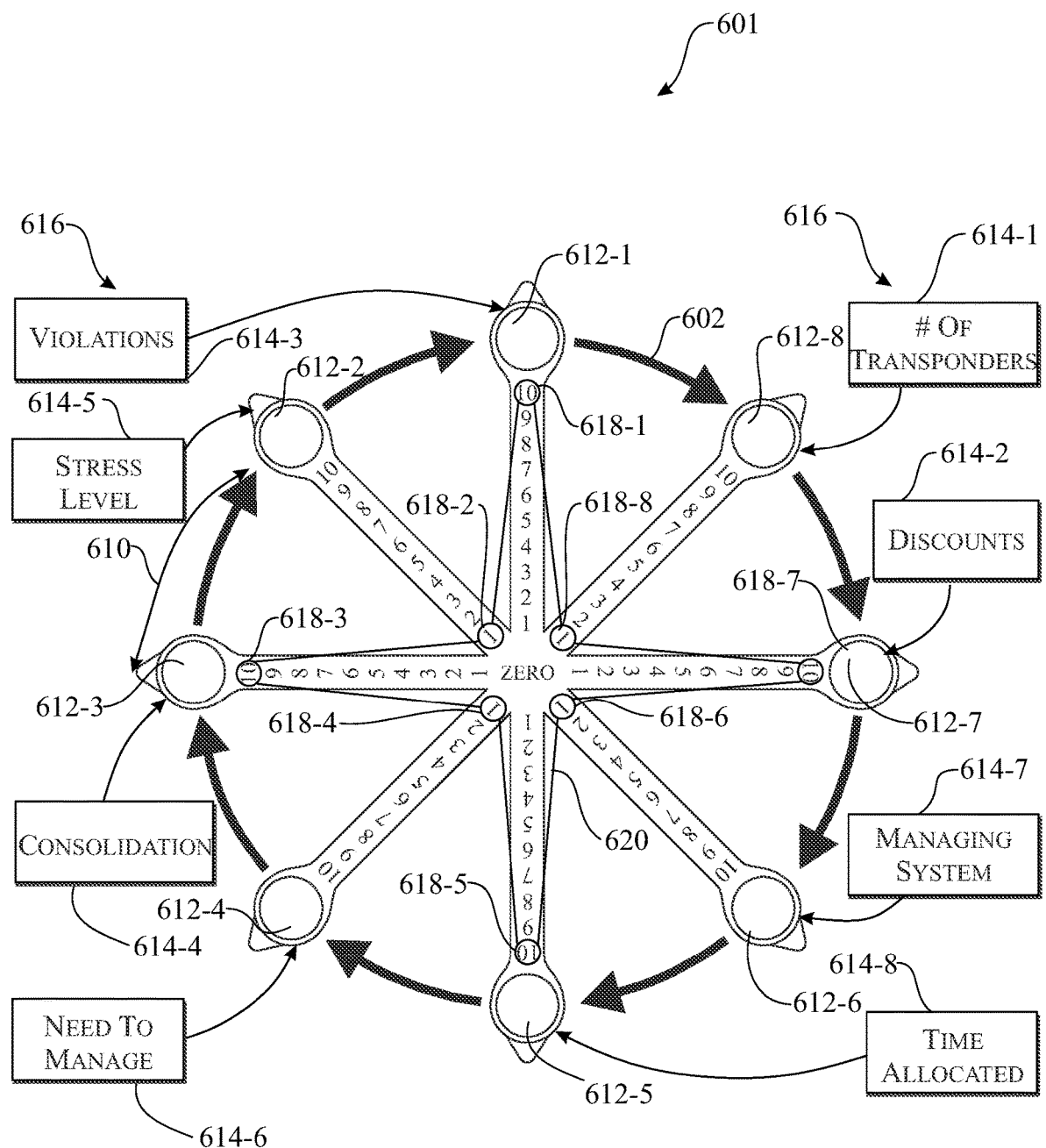

Turning our attention now to FIG. 7 and graphical interface 601 thereof, in accordance with the embodiment, each input of the plurality of inputs received is specific to a respective one individual product need assessment category of the plurality of individual product need assessment categories. That is, each of the number of transponders 614-1, the discounts 614-2, the violations 614-3, the consolidation 614-4, the stress level 614-5, the need to manage 614-6, the managing system 614-7 and the time allocated 614-8, and said input further comprises at least a selection of a respective one metric of the plurality of metrics from the graduated consumer assessment scale. As shown, the consumer has made input selection 618-1 (i.e., 10 out of 10), input selection 618-2 (i.e., 1 out of 10), input selection 618-3 (i.e., 10 out of 10), input selection 618-4 (i.e., 1 out of 10), input selection 618-5 (i.e., 10 out of 10), input selection 618-6 (i.e., 1 out of 10), input selection 618-7 (i.e., 10 out of 10), and input selection 618-8 (i.e., 1 out of 10). In turn, there is then an updating of the graphical interface displayed as function of the plurality of inputs received such that the updated graphical interface shows a respective one graduated consumer assessment scale associated with each individual category of a plurality of individual categories together with each input of the plurality of inputs received and the respective one metric of the plurality of metrics from the graduated consumer assessment scale selected, and generating, as part of the graphical interface updated, a visual depiction 620, as shown in FIG. 7, of a relationship between each respective one input received in relation to each other. In the illustration of FIG. 7, the visual depiction 620 is a star-like shape indicating a serious need of the product under assessment and being offered for sale. That is, in accordance with the principles of the disclosed embodiments, the more uniform in nature that the visual depiction rendered is this will depict a lesser need for the product based on the customer's own assessment.

Figure 8:
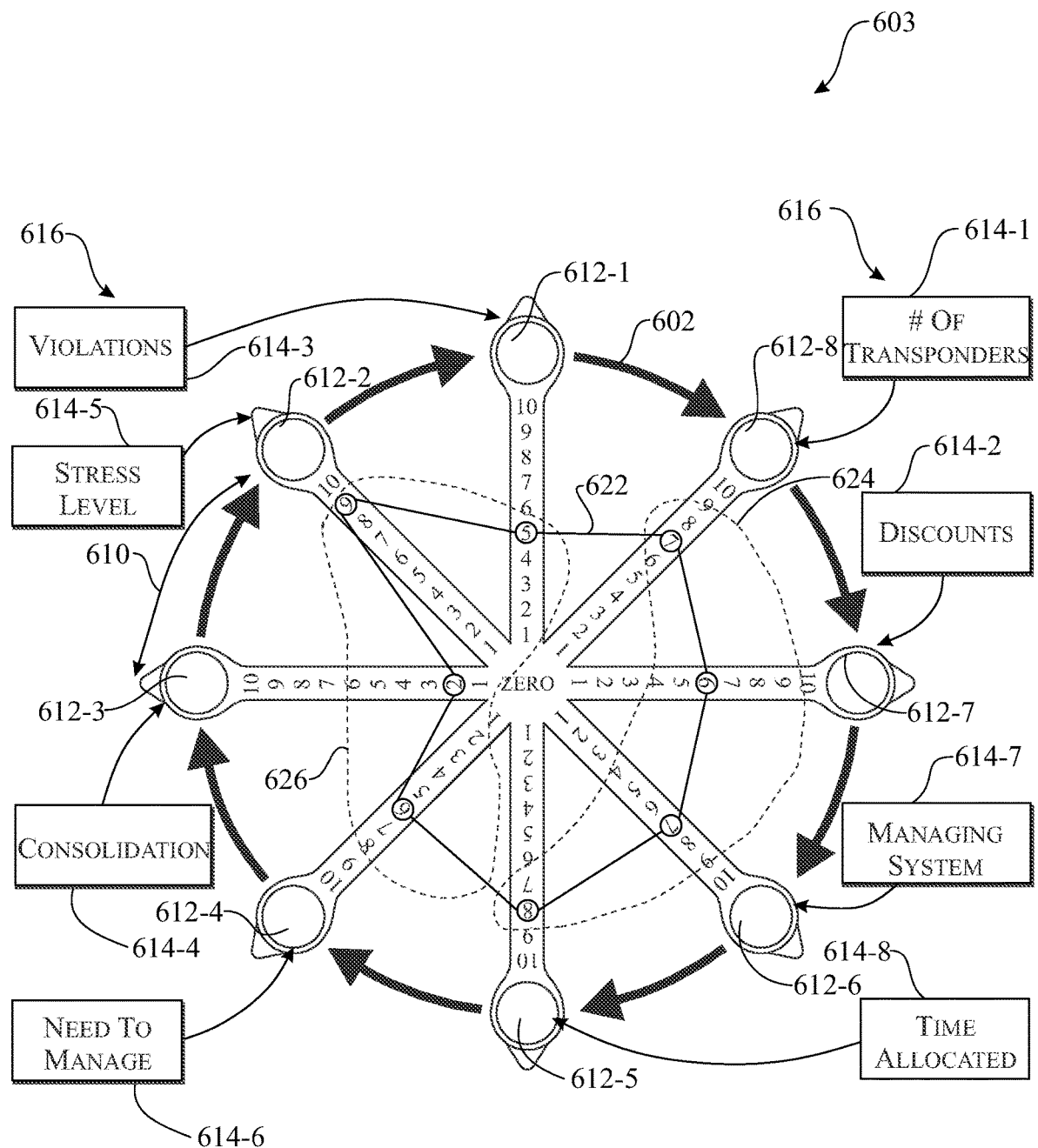
Figure 9:
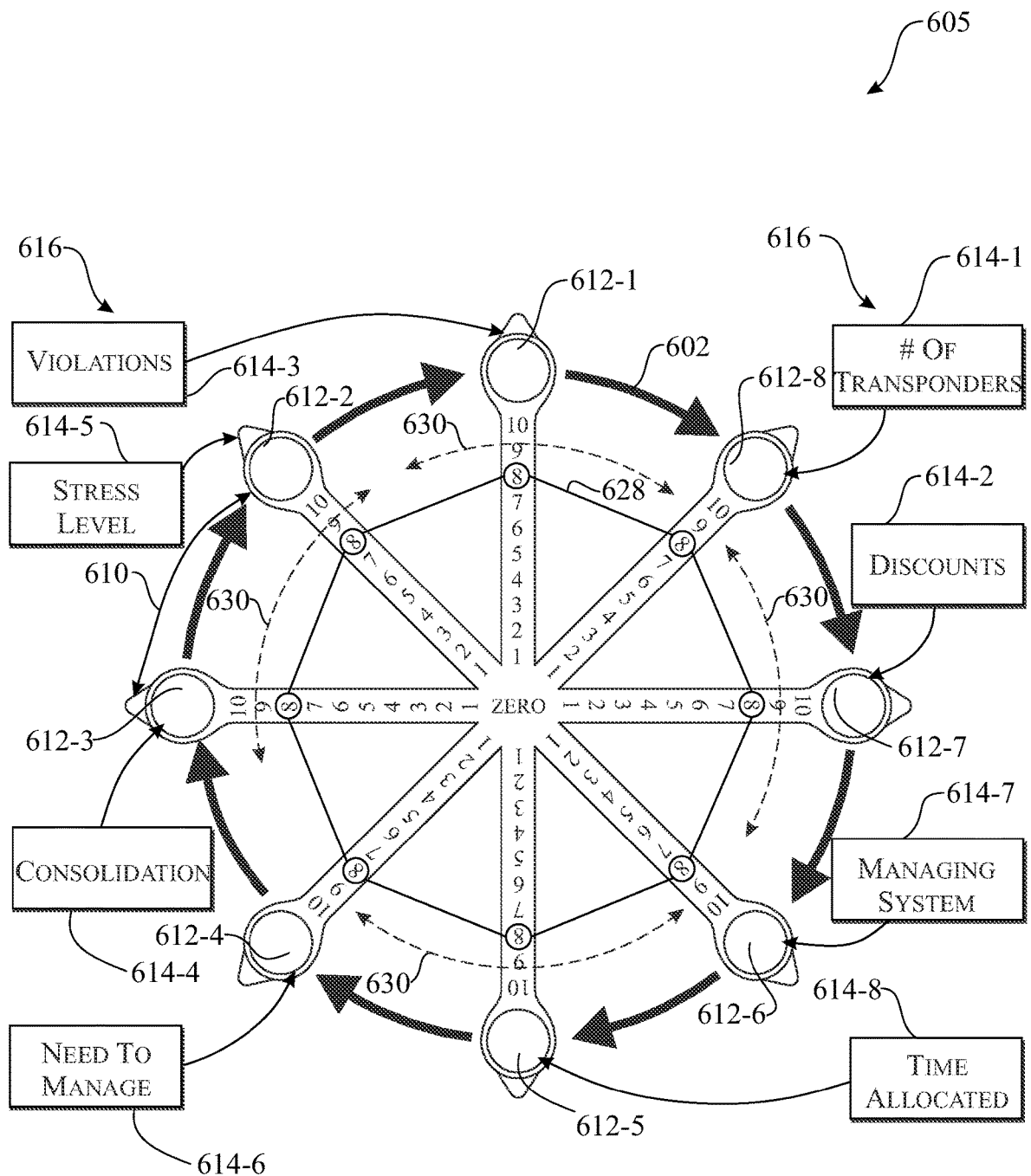

Said another way, if the desired rendered relationship rendered in any one visual depiction is that of a circle, then this relationship between the plurality of metrics (as determined in accordance with the consumer's direct and interactive product needs assessment inputs) is the most desirable and indicative of a lesser (or no) need for the product being offered for sale. These principles are further illustrated by FIG. 8 and FIG. 9, respectively. In particular, as shown in FIG. 8 and graphical interface 603 thereof, visual depiction 622 rendered from another set of received customer inputs shows better uniformity in portion 624 of the visual depiction 622 indicative of a lesser need for the product being offered for sale in terms of the individual product need assessment categories of the number of transponders 614-1, the discounts 614-2, the managing system 614-7, and the time allocated 614-8. Conversely, portion 626 of the visual depiction 622 is indicative of a greater need for the product being offered for sale in terms of the individual product need assessment categories of the violations 614-3, the consolidation 614-4, the stress level 614-5, and the need to manage 614-6. Further, as shown in FIG. 9 and graphical interface 605 thereof, the visual depiction 628 rendered from yet another set of received consumer inputs shows the desired (i.e., best) uniformity 630 and is indicative of a lesser (or no) need for the product being offered for sale in terms of each of the individual product need assessment categories. Further, in accordance with an embodiment, in addition to informing the consumer in a real-time, interactive way with respect to a particular product need, the graphical interface and rendered visual depiction (e.g., graphical interface 605 and the visual depiction 628) also assist the seller (e.g., seller 1 118-1) in their ability to adapt their sales funnel approach and/or product offering to address inefficiencies in respect to their overall product sales approach including, but not limited to, the performance of individual sales associates that are representing the company and selling their products.

Figure 5:
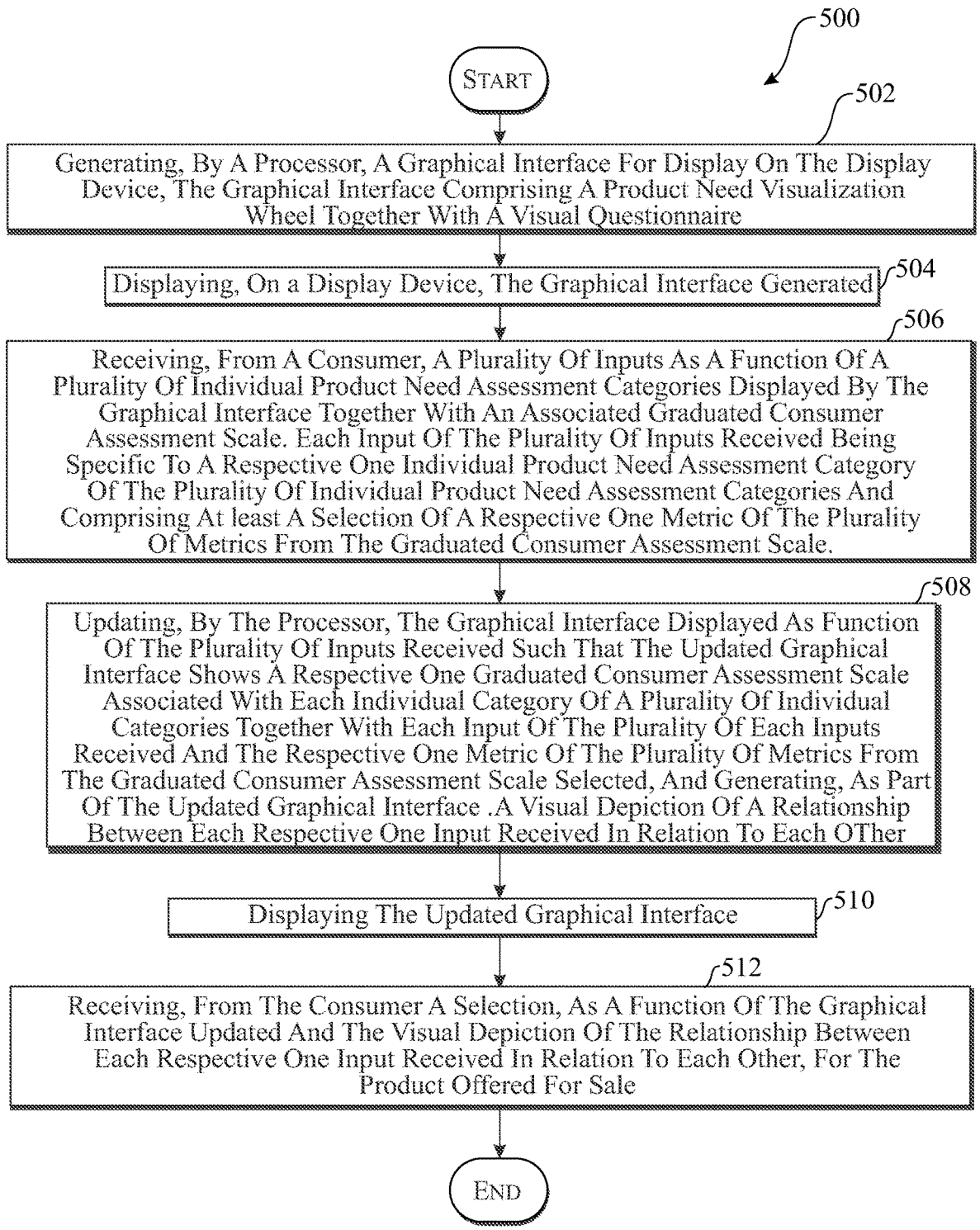
FIG. 5 presents a flowchart of illustrative operations for providing an interactive sales funnel for use with the interactive sales funnel system of FIG. 2 in accordance with an embodiment.

Turning our attention to FIG. 5, a flowchart of illustrative operations 500 are shown for providing an interactive sales funnel management tool for use with the interactive sales funnel system of FIG. 2 in accordance with an embodiment. In accordance with FIG. 5, the operations 500 comprising, at step 502, generating, by the processor, a graphical interface for display on the display device. As detailed above, the graphical interface comprising a product need visualization wheel together with a visual questionnaire, and the product need visualization wheel comprising a form of a circular wheel with a center point, a circumference, and a plurality of spokes, each spoke configured between the center point and a particular one point along the circumference of the wheel in a symmetric configuration thereabout. Further, the visual questionnaire comprising a plurality of individual product need assessment categories specific to a product offered for sale to a consumer in accordance with criteria associated with a sales funnel, wherein each individual product need assessment category of the plurality of product need assessment categories having a corresponding graduated consumer assessment scale associated therewith. As detailed above, the graduated consumer assessment scale comprising a plurality of metrics for establishing the consumer's need for the product offered for sale, and each particular one spoke of the plurality of spokes corresponding with a particular one individual product need assessment category of the plurality of product need assessment categories. In this way, the product need visualization wheel showing, along a respective one spoke of the plurality of spokes, a respective one graduated consumer assessment scale associated with each individual product need assessment category of the plurality of individual product need assessment categories.

Then, at step 504, displaying, on the display device, the graphical interface generated (see, e.g., FIGS. 6-9) and at step 506 receiving, from the consumer, a plurality of inputs as a function of the plurality of individual product need assessment categories displayed by the graphical interface and the corresponding graduated consumer assessment scale associated therewith. As detailed herein above, each input of the plurality of inputs received being specific to a respective one individual product need assessment category of the plurality of individual product need assessment categories and comprising at least a selection of a respective one metric of the plurality of metrics from the graduated consumer assessment scale. At step 508, updating, by the processor, the graphical interface displayed as function of the plurality of inputs received such that the updated graphical interface shows a respective one graduated consumer assessment scale associated with each individual category of a plurality of individual categories together with each input of the plurality of inputs received and the respective one metric of the plurality of metrics from the graduated consumer assessment scale selected, and generating, as part of the graphical interface updated, a visual depiction of a relationship between each respective one input received in relation to each other.

In this way, the operations facilitate an interactive engagement, by and through a specifically configured application executing, for example, on the interactive sales funnel system 200, with the individual consumer that allows the consumer to play an important role in the overall sales process and coming to their own realization of whether they need a particular product or not based on a customized needs assessment. That is, the customer is actively engaged and formulates their own product need assessment, for example, through the AIA model steps of (1) awareness—the customer is aware of the existence of a product or service; (2) interest—actively expressing an interest in a product group; (3) desire—aspiring to a particular brand or product; and (4) action—taking the next step towards purchasing the chosen product. This interactive engagement, in accordance with the disclosed embodiments, is facilitated directly by the customized visualization tool and graphical interface as generated, presented and updated in accordance with the principles of the disclosed embodiments herein.

Continuing at step 510, displaying the updated graphical interface updated; and at step 512 receiving from the consumer a selection, as a function of the graphical interface updated and the visual depiction of the relationship between each respective one input received in relation to each other, for the product offered for sale. As noted above, if the desired rendered relationship in any one visual depiction is that of a circle (see, e.g., FIG. 9) then this relationship between the plurality of metrics is the most desirable and indicative of a lesser (or no) need for the product being offered for sale. Conversely, the further the displayed rendered relationship represents such circular shape (see, e.g., FIGS. 6-8) this is an indication to the consumer of an identified need(s) for the product offered for sale and supports a decision to purchase such product. By navigating through the visual questionnaire and rendered product need visualization wheel(s), by and through the displayed graphical interface, the consumer can easily ascertain and visualize their need for a particular product as a function of their own direct product need assessments and not unduly influenced by others (e.g., a salesperson).

As noted above, in some embodiments the method or methods described above may be executed or carried out by a computing system including a tangible computer-readable storage medium, also described herein as a storage machine, that holds machine-readable instructions executable by a logic machine (i.e., a processor or programmable control device) to provide, implement, perform, and/or enact the above-described methods, processes and/or tasks. When such methods and processes are implemented, the state of the storage machine may be changed to hold different data. For example, the storage machine may include memory devices such as various hard disk drives, CD, or DVD devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a graphical user interface (GUI), or any visual element of the methods or processes described above. For example, the display subsystem, storage machine, and logic machine may be integrated such that the above method may be executed while visual elements of the disclosed system and/or method are displayed on a display screen for user consumption. The computing system may include an input subsystem that receives user input. The input subsystem may be configured to connect to and receive input from devices such as a mouse, keyboard, or gaming controller. For example, a user input may indicate a request that certain task is to be executed by the computing system, such as requesting the computing system to display any of the above-described information or requesting that the user input updates or modifies existing stored information for processing. A communication subsystem may allow the methods described above to be executed or provided over a computer network. For example, the communication subsystem may be configured to enable the computing system to communicate with a plurality of personal computing devices. The communication subsystem may include wired and/or wireless communication devices to facilitate networked communication. The described methods or processes may be executed, provided, or implemented for a user or one or more computing devices via a computer-program product such as via an application programming interface (API).

Thus, the steps of the disclosed method (see, e.g., FIG. 5) and the associated discussion herein above can be defined by the computer program instructions stored in a memory and/or data storage device and controlled by a processor executing the computer program instructions. Accordingly, by executing the computer program instructions, the processor executes an algorithm defined by the disclosed method. For example, the computer program instructions can be implemented as computer executable code programmed by one skilled in the art to perform the illustrative operations defined by the disclosed methods. Further, it will be appreciated that any flowcharts, flow diagrams, state transition diagrams, pseudo code, program code and the like represent various processes which may be substantially represented in computer readable medium and so executed by a computer, machine, or processor, whether or not such computer, machine or processor is explicitly shown. One skilled in the art will recognize that an implementation of an actual computer or computer system may have other structures and may contain other components as well, and that a high-level representation of some of the components of such a computer is for illustrative purposes.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. An interactive sales funnel system comprising:
a display device;
a processor;
a memory storing instructions that when executed cause the processor to perform operations comprising:
generating, by the processor, a graphical interface for display on the display device, the graphical interface comprising a product need visualization wheel together with a visual questionnaire, the product need visualization wheel comprising a form of a circular wheel with a center point, a circumference and a plurality of spokes, each spoke configured between the center point and a particular one point along the circumference of the wheel in a symmetric configuration thereabout, the visual questionnaire comprising a plurality of individual product need assessment categories specific to a product offered for sale to a consumer in accordance with criteria associated with a sales funnel, each individual product need assessment category of the plurality of product need assessment categories having a corresponding graduated consumer assessment scale associated therewith, the corresponding graduated consumer assessment scale comprising a plurality of metrics for establishing the consumer's need for the product offered for sale, each particular one spoke of the plurality of spokes corresponding with a particular one individual product need assessment category of the plurality of product need assessment categories, and the product need visualization wheel showing, along a respective one spoke of the plurality of spokes, a respective one graduated consumer assessment scale associated with each individual product need assessment category of the plurality of individual product need assessment categories such that the respective one graduated consumer assessment scale associated with each individual product need assessment category has a predetermined position along the circumference of the wheel;

displaying, on the display device, the graphical interface generated, wherein each one of the respective one graduated consumer assessment scales associated with each individual product need assessment category is displayed at a predetermined position along the circumference of the wheel;

receiving, from the consumer, a plurality of inputs as a function of the plurality of individual product need assessment categories displayed by the graphical interface and the corresponding graduated consumer assessment scale associated therewith, each input of the plurality of inputs received being specific to a respective one individual product need assessment category of the plurality of individual product need assessment categories and comprising at least a selection of a respective one metric of the plurality of metrics from the corresponding graduated consumer assessment scale;

updating, by the processor, the graphical interface displayed as function of the plurality of inputs received such that the graphical interface updated shows a respective one graduated consumer assessment scale associated with each individual category of a plurality of individual categories together with each input of the plurality of inputs received and the respective one metric of the plurality of metrics from the corresponding graduated consumer assessment scale selected, and generating, as part of the graphical interface updated, a visual depiction of a relationship between each respective one input received in relation to each other;

displaying, on the display device, the graphical interface updated, wherein each one of the respective one graduated consumer assessment scales associated with each individual product need assessment category is displayed by the graphical interface updated at the predetermined position along the circumference of the wheel thereby contributing to rendering of the visual depiction of the relationship between each respective one input received in relation to each other; and receiving, from the consumer a selection, as a function of the graphical interface updated and the visual depiction generated of the relationship between each respective one input received in relation to each other, for the product offered for sale.

2. The interactive sales funnel system of claim 1, wherein the sales funnel and the product offered for sale are directed to a toll management product that may be used by transportation professionals to manage infrastructure tolls collected by tolling authorities.

3. The interactive sales funnel system of claim 1, wherein the plurality of product need assessment categories comprise a number of transponders, discounts, violations, consolidation, stress level, need to manage, managing system and time allocated.

4. The interactive sales funnel system of claim 1, wherein the corresponding graduated consumer assessment scale is a numerical scale.

5. The interactive sales funnel system of claim 4, wherein the numerical scale comprises a range from 1 to 10, wherein an assessment of "1" represents a worst or lowest rating possible rating and an assessment of "10" represents a best or highest rating possible.

6. The interactive sales funnel system of claim 1, wherein a uniformity of the visual depiction generated of the relationship between each respective one input received in relation to each other is indicative of a need for the product for sale based on an assessment of the consumer.

7. The interactive sales funnel system of claim 6, wherein the greater the uniformity of the visual depiction generated of the relationship between each respective one input received in relation to each other represents a lesser need for the product offered for sale by the consumer.

8. The interactive sales funnel system of claim 6, wherein if the visual depiction generated of the relationship between each respective one input received in relation to each other in any one visual depiction is that of a circle, then the relationship between the plurality of metrics, as depicted by the visual depiction generated, is indicative of a lesser need for the product offered for sale by the consumer.

9. The interactive sales funnel system of claim 6, wherein the lesser the uniformity of the visual depiction generated of the relationship between each respective one input received in relation to each other represents a greater need for the product offered for sale by the consumer.

10. The interactive sales funnel system of claim 1, wherein a uniformity of the visual depiction generated of the relationship between each respective one input received in relation to each other is used to determine the consumer's need for at least the product offered for sale.

11. The interactive sales funnel system of claim 1, wherein the product need visualization wheel and the visual questionnaire are fully customizable.

12. The interactive sales funnel system of claim 11, wherein the customization of the product need visual wheel and the visual questionnaire is a function of a particular product and a particular market.

13. The interactive sales funnel system of claim 1, wherein the display device is part of a mobile device.

14. The interactive sales funnel system of claim 13, wherein the mobile device is one of a smartphone, a laptop computer, a tablet, and a wearable device.

15. An interactive sales funnel system comprising:
a processor;

a display device;
a memory storing instructions that when executed cause the processor to perform operations comprising:
generating, by the processor, a graphical interface for display on the display device, the graphical interface comprising a product need visualization wheel together with a visual questionnaire, the product need visualization wheel comprising a form of a circular wheel with a center point, a circumference and a plurality of spokes, each spoke configured between the center point and a particular one point along the circumference of the wheel in a symmetric configuration thereabout, the visual questionnaire comprising a plurality of individual product need assessment categories specific to a product offered for sale to a consumer in accordance with criteria associated with a sales funnel, each individual product need assessment category of the plurality of product need assessment categories having a corresponding graduated consumer assessment scale associated therewith, the corresponding graduated consumer assessment scale comprising a plurality of metrics for establishing the consumer's need for the product offered for sale, each particular one spoke of the plurality of spokes corresponding with a particular one individual product need assessment category of the plurality of product need assessment categories, and the product need visualization wheel showing, along a respective one spoke of the plurality of spokes, a respective one graduated consumer assessment scale associated with each individual product need assessment category of the plurality of individual product need assessment categories such that the respective one graduated consumer assessment scale associated with each individual product need assessment category has a predetermined position along the circumference of the wheel, and wherein the plurality of product need assessment categories comprise a number of transponders, discounts, violations, consolidation, stress level, need to manage, managing system and time allocated, and the sales funnel and the product offered for sale are directed to a toll management product that may be used by transportation professionals to manage infrastructure tolls collected by tolling authorities;
displaying, on the display device, the graphical interface generated;
receiving, from the consumer, a plurality of inputs as a function of the plurality of individual product need assessment categories displayed by the graphical interface and the corresponding graduated consumer assessment scale associated therewith, each input of the plurality of inputs received being specific to a respective one individual product need assessment category of the plurality of individual product need assessment categories and comprising at least a selection of a respective one metric of the plurality of metrics from the corresponding graduated consumer assessment scale;
updating, by the processor, the graphical interface displayed as function of the plurality of inputs received such that the graphical interface updated shows a respective one graduated consumer assessment scale associated with each individual category of a plurality of individual categories together with each input of the plurality of inputs received and the respective one metric of the plurality of metrics from the corresponding graduated consumer assessment scale selected, and generating, as part of the graphical interface updated, a visual depiction of a relationship between each respective one input received in relation to each other, and wherein a uniformity of the visual depiction of the relationship between each respective one input received in relation to each other is used to determine the consumer's need for at least the product offered for sale;
displaying, on the display device, the graphical interface updated, wherein each one of the respective one graduated consumer assessment scales associated with each individual product need assessment category is displayed by the graphical interface updated at the predetermined position along the circumference of the wheel thereby contributing to rendering of the visual depiction of the relationship between each respective one input received in relation to each other; and
receiving, from the consumer a selection, as a function of the graphical interface updated and the visual depiction generated of the relationship between each respective one input received in relation to each other, for the product offered for sale.

16. The interactive sales funnel system of claim 15, wherein the product need visualization wheel and the visual questionnaire are fully customizable as a function of a particular product and a particular market.

17. The interactive sales funnel system of claim 15, wherein the graduated consumer assessment scale is a numerical scale comprising a range from 1 to 10, wherein an assessment of "1" represents a worst or lowest rating possible rating and an assessment of "10" represents a best or highest rating possible.

18. The interactive sales funnel system of claim 15, wherein the greater the uniformity of the visual depiction generated of the relationship between each respective one input received in relation to each other represents a lesser need for the product offered for sale by the consumer.

19. The interactive sales funnel system of claim 15, wherein the lesser the uniformity of the visual depiction generated of the relationship between each respective one input received in relation to each other represents a greater need for the product offered for sale by the consumer.

20. An interactive sales funnel system for electronically signing an electronic document, the interactive sales funnel system comprising:
a processor;
a display device;
a memory storing instructions that when executed cause the processor to perform operations comprising:
generating, by the processor, a graphical interface for display on the display device, the graphical interface comprising a product need visualization wheel together with a visual questionnaire, the product need visualization wheel comprising a form of a circular wheel with a center point, a circumference and a plurality of spokes, each spoke configured between the center point and a particular one point along the circumference of the wheel in a symmetric configuration thereabout, the visual questionnaire comprising a plurality of individual product need assessment categories specific to a product offered for sale to a consumer in accordance with criteria associated with a sales funnel, each individual product need assessment category of the plurality of product need assessment categories having a corresponding graduated consumer assessment scale associated therewith, the corresponding graduated consumer assessment scale comprising a plurality of metrics for establishing the consumer's need for the product offered for sale, each particular one spoke of the plurality of spokes corresponding with a particular one individual product need assessment category of the plurality of product need assessment categories, and the product need visualization wheel showing, along a respective one spoke of the plurality of spokes, a respective one graduated consumer assessment scale associated with each individual product need assessment category of the plurality of individual product need assessment categories such that the respective one graduated consumer assessment scale associated with each individual product need assessment category has a predetermined position along the circumference of the wheel, and wherein the plurality of product need assessment categories comprise a number of transponders, discounts, violations, consolidation, stress level, need to manage, managing system and time allocated, and the graduated consumer assessment scale is a numerical scale comprising a range from 1 to 10, wherein an assessment of "1" represents a worst or lowest rating possible rating and an assessment of "10" represents a best or highest rating possible;

displaying, on the display device, the graphical interface generated;

receiving, from the consumer, a plurality of inputs as a function of the plurality of individual product need assessment categories displayed by the graphical interface and the corresponding graduated consumer assessment scale associated therewith, each input of the plurality of inputs received being specific to a respective one individual product need assessment category of the plurality of individual product need assessment categories and comprising at least a selection of a respective one metric of the plurality of metrics from the graduated consumer assessment scale;

updating, by the processor, the graphical interface displayed as function of the plurality of inputs received such that the graphical interface updated shows a respective one graduated consumer assessment scale associated with each individual category of a plurality of individual categories together with each input of the plurality of inputs received and the respective one metric of the plurality of metrics from the corresponding graduated consumer assessment scale selected, and generating, as part of the graphical interface updated, a visual depiction of a relationship between each respective one input received in relation to each other, and wherein a uniformity of the visual depiction of the relationship between each respective one input received in relation to each other is used to determine the consumer's need for at least the product offered for sale;

displaying, on the display device, the graphical interface updated, wherein each one of the respective one graduated consumer assessment scales associated with each individual product need assessment category is displayed by the graphical interface updated at the predetermined position along the circumference of the wheel thereby contributing to rendering of the visual depiction of the relationship between each respective one input received in relation to each other;

receiving, from the consumer a selection, as a function of the graphical interface updated and the visual depiction generated of the relationship between each respective one input received in relation to each other, for the product offered for sale; and wherein the greater the uniformity of the visual depiction generated of the relationship between each respective one input received in relation to each other represents a lesser need for the product offered for sale by the consumer, and the lesser the uniformity of the visual depiction generated of the relationship between each respective one input received in relation to each other represents a greater need for the product offered for sale by the consumer.

* * * * *